United States Patent

[11] 3,572,888

[72] Inventor Takashi Kawashima
 Tokyo, Japan
[21] Appl. No. 854,833
[22] Filed Sept. 3, 1969
[45] Patented Mar. 30, 1971
[73] Assignee Olympus Optical Co., Ltd.
 Tokyo, Japan
[32] Priority Sept. 10, 1968, Sept. 10, 1968
[33] Japan
[31] 43/64674 and 43/64675

[54] ROTARY AND TRANSVERSELY ADJUSTABLE MICROSCOPE STAGE
 5 Claims, 8 Drawing Figs.
[52] U.S. Cl. .................................. 350/86, 74/29, 269/61
[51] Int. Cl. ................................. G02b 21/26
[50] Field of Search .................... 74/29; 350/86—90; 269/61

[56] References Cited
UNITED STATES PATENTS
1,891,052 12/1932 Ott ............................ 350/90X
2,003,387 6/1935 Ott ............................ 350/86
2,148,908 2/1939 Lory .......................... 350/90

Primary Examiner—David Schonberg
Assistant Examiner—T. H. Kusmer
Attorney—Kurt Kelman ABSTRACT: Cross-moving stage of a microscope comprising a lower stage member supported by a support member of the microscope rotatably about the optical axis of the microscope, an upper stage member slidably supported on the lower stage member, and a clamping holder for a slide glass slidably supported on the upper stage member by a slide member guided in the upper stage member. The support member mounts thereon rotatably a first handle and a second handle coaxially with the first handle. The first handle moves the upper stage member regardless of the rotational position of the lower stage member while the first handle is kept stationarily with respect to the microscope. The second handle moves the clamping holder relative to the upper stage member by operating the second handle independently from the displacement of the upper stage member relative to the lower stage member regardless of the rotational position of the lower stage member.

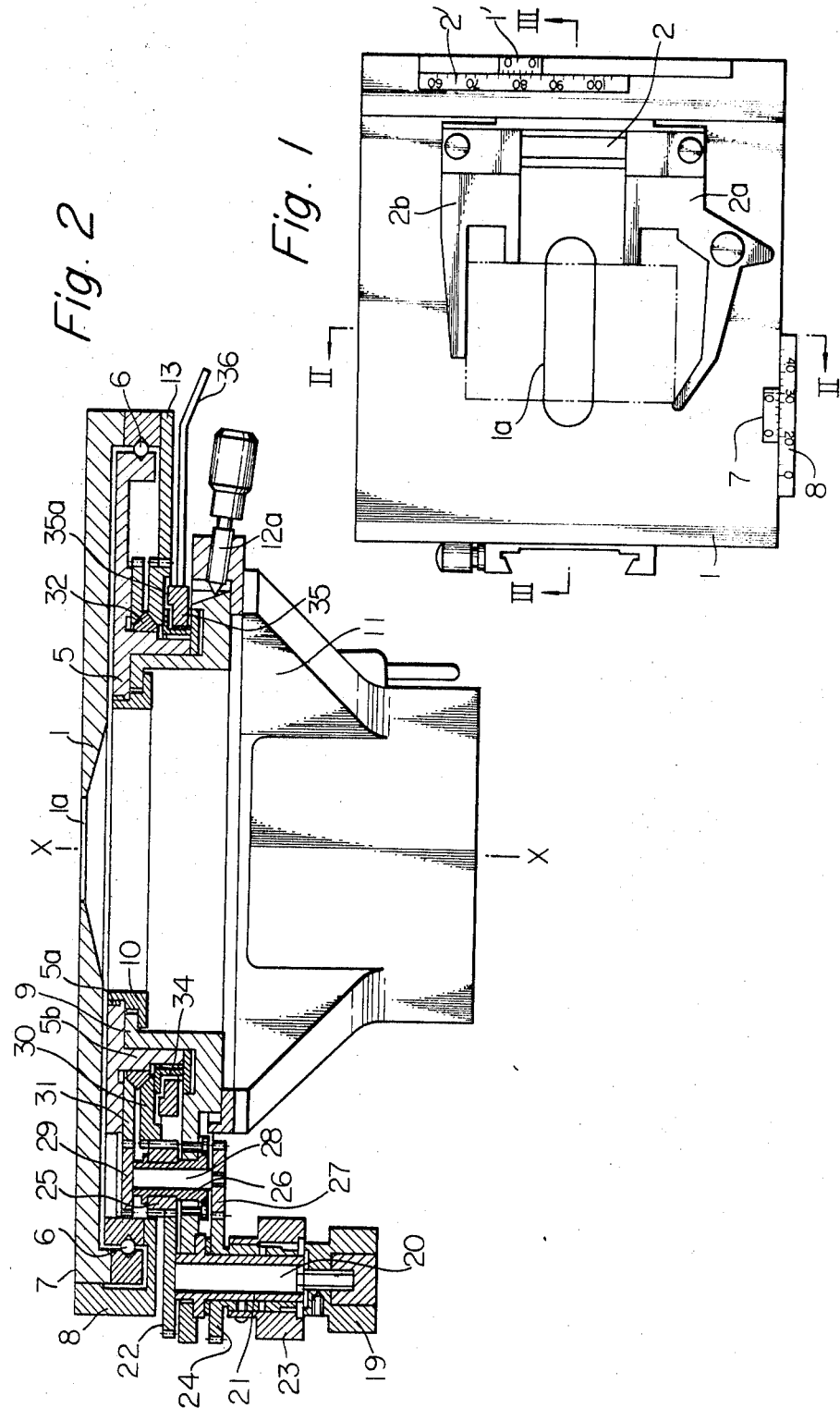

ROTARY AND TRANSVERSELY ADJUSTABLE MICROSCOPE STAGE

BACKGROUND OF THE INVENTION

The present invention relates to a stage of a microscope and, more particularly, to a rotary cross-moving stage of a microscope having its handles for operating the stage for the cross-movement thereof kept stationarily with respect to the microscope regardless of the rotation and the operation of the stage.

In the operation of a conventional microscope, stage operating handles are very frequently operated together with focusing handles for the coarse and fine adjustment of the relative position between a specimen to be inspected and an objective used in the observation thereof. Therefore, it is desirable to locate such handles as the focusing handles and the stage operating handles at positions near the table so as to make it convenient to manipulate them during the observation of the specimen for a long time. Since the manipulation of the handles are required to be carried out while the specimen is being inspected, it is desirable to keep the handles at stationary positions with respect to the microscope in order to easily touch the handles without seeking the handles by the observer's eyes.

In the prior art microscope, the stage operating handles are mounted on the movable stage member of the stage, therefore, when the stage is operated so as to move the movable stage member, the handles are moved relative to the microscope together with the movable stage member thereby making it very difficult to touch the handles for the operation thereof without seeking them by the eyes.

Such difficulties are more significant when the stage is rotatable. Since it is a usual practice in the observation of a specimen by using a microscope that the observer makes a record about the specimen on a paper by using a pencil held by his right or left hand while the focusing handles or the stage operating handles are manipulated by the other hand during the observation of the specimen, it is made extremely difficult to operate the stage operating handles when the same are moved to positions inconvenient for the operation thereof as the stage is rotated.

Further, since the stage operating handles of the prior art are moved relative to the microscope when the stage is operated, it is necessary to provide a sufficient space around the microscope for the free movement of the handles without interfering with other elements of the microscope, thereby making it very difficult to design a microscope which is compact in size and simple and efficient in construction.

Further, since the stage operating handles of the prior art are moved relative to the microscope when the stage is operated, it is difficult to use the microscope in a thermostat by utilizing a remote control means with or without an electric motor for driving the handles.

The present invention aims at avoiding the above described disadvantages of the stage of the prior art microscope and providing a novel and useful cross-moving stage of a microscope.

SUMMARY OF THE INVENTION

An object of the present invention is to provide a novel and useful cross-moving stage of a microscope which avoids the above described disadvantages of the stage of the prior art microscope.

Another object of the present invention is to provide a novel and useful stage of the type described above in which the stage operating handles thereof are kept stationarily with respect to the microscope on which it is mounted regardless of the positions of the cross-movement of the movable stage members moved by the handles so as to facilitate the operation of the handles.

Further object of the present invention is to provide a novel and useful stage of the type described above which is rotatable and in which the stage operating handles are kept stationarily with respect to the microscope regardless of the rotational position of the stage so as to facilitate the operation of the handles.

The objects of the present invention are achieved in accordance with the present invention by providing two stage operating handles for the cross-movement of the stage each rotatably mounted on a stationary support member of the stage mounted on the microscope and each provided with a gear fixedly secured thereto, two rack means, one of which is fixedly secured to an upper stage member slidably mounted on a lower stage member so as to be moved in one direction with respect to the lower stage member and extends in the one direction of the movement of the upper stage member, while the other rack means is fixedly secured to a slide member slidably mounted on the lower stage member so as to be moved relative to the lower stage member in a direction at a predetermined angle, preferably at a right angle, to the one direction of the movement of the upper stage member and extends in the direction of the movement of the slide member, the slide member being operatively coupled with another slide member slidably guided in the upper stage member and carrying thereon a clamping holder for a slide glass of a specimen so as to be moved together with the clamping holder relative to the upper stage member in a direction at a predetermined angle, preferably at a right angle, to the one direction of the movement of the upper stage member through pin-slot means operatively connecting the two slide members to each other, the slot of which extends in the one direction of the movement of the upper stage member so that the movement of the upper stage member does not affect the relative position between the two slide members, and two coupling gear means each mounted on the lower stage member and each adapted to be coupled with the respective gears of the handles and the respective rack means so that the upper stage member and the clamping holder are separately moved by the operation of either of the two stage operating handles for the cross-movement of the stage while the handles are kept stationarily with respect to the microscope regardless of the positions of the upper stage member and the clamping holder to which they are moved by the operation of the handles.

In accordance with another feature of the present invention, the lower stage member is rotatably mounted on the support member so as to be rotated about the axis of the microscope and each of the coupling gear means comprises a ring gear rotatable about the axis of rotation of the lower stage member which engages with the respective rack means and the respective gears of the two handles through an idle gear rotatably supported on the support member so that the operative coupling of the respective ring gears with the mating gears of the handles is maintained at all times regardless of the rotational position of the lower stage member while the stage operating handles are kept stationarily with respect to the microscope.

Clamping means is provided so as to clamp the lower stage member against either of the ring gears or the support member so that the lower stage member is rotated without changing the relative positions of the upper stage member and the clamping holder with respect to the lower stage member by clamping the ring gears against the lower stage member while the lower stage member is held in its rotated position by clamping the lower stage member against the support member by the action of the clamping means.

By the cross-moving stage of the present invention, since the stage operating handles are kept stationarily with respect to the microscope regardless of the operation of the stage, the operation of the handles is made extremely easy while the design of the microscope is made easy, because the space required for the movement of the handles relative to the microscope is dispensed with.

BRIEF DESCRIPTION OF THE DRAWINGS

FIG. 1 is a general plan view showing one embodiment of the cross-moving stage constructed in accordance with the present invention;

FIG. 2 is a cross-sectional view taken along line II–II in FIG. 1;

DETAILED DESCRIPTION OF THE PREFERRED EMBODIMENT

Figure 3:
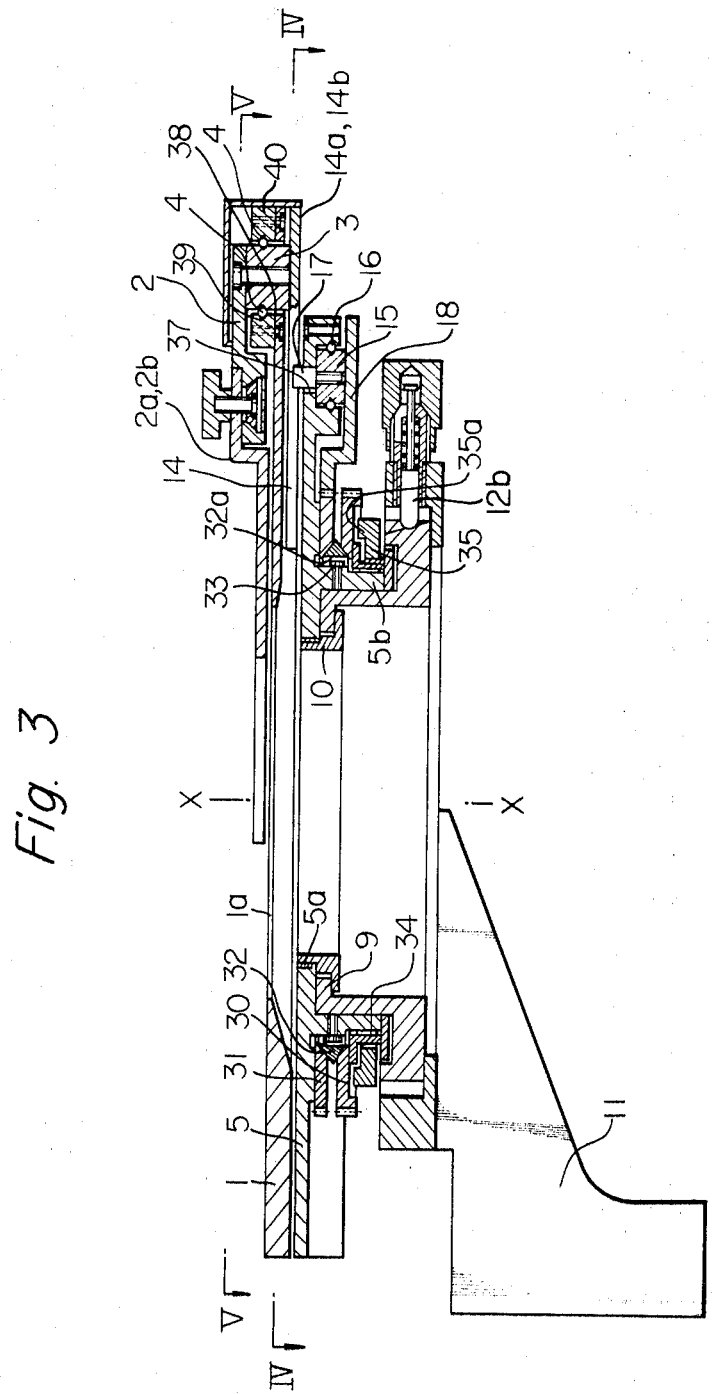
FIG. 3 is a cross-sectional view taken along line III–III in FIG. 1.

Referring to FIG. 1, an upper stage 1 slidably supports thereon a clamping holder 2 having a pair of clamping arms 2a and 2b in the conventional manner. As shown in FIG. 3, the clamping holder 2 is supported by a slide member 3 slidably guided in the upper stage member 1 by means of bearing balls 4 so that the slide member 3 is moved in the direction perpendicular to the plane of FIG. 3, i.e., in the vertical direction in FIG. 1 together with the clamping holder 2.

As shown in FIG. 2, the upper stage member 1 is slidably supported on a lower stage member 5 by means of bearing balls 6 so that the upper stage member 1 is moved in the direction at a predetermined angle to the direction of the movement of the clamping holder 2 relative to the upper stage member 1. In the drawings, the predetermined angle is selected to be a right angle. Thus, the upper stage member 1 is moved in the left and right direction in FIGS. 1 and 3 relative to the lower stage member 5 while the clamping holder 2 is moved in the up and down direction in FIG. 1 relative to the upper stage member 1, i.e., in the direction perpendicular to the plane of FIG. 3.

The upper stage member 1 is provided with a vernier scale 7 which cooperates with a scale 8 secured to the lower stage member 5 so that the amount of the movement of the upper stage member 1 relative to the lower stage member 5 is read out by the scales 7, 8. Similarly, the upper stage member 1 and the clamping holder 2 are provided with a vernier scale and a scale 1' and 2' cooperating with each other so as to indicate the relative movement of the clamping holder 2 relative to the upper stage member 1.

The upper stage member 1 is provided with an elongated hole 1a for passing the light from the specimen therethrough to the objective of the microscope.

The lower stage member 5 is rotatably mounted on a support member 9 and provided with a central threaded hole 5a. A threaded flanged ring 10 is threaded in the central hole 5a with the flanged portion of the ring 10 engaging with the upper inwardly bent annular portion of the support member 9 so that the lower stage member 5 is rotatably held on the support member 9.

The support member 9 is adjustably mounted on a holder bracket 11 which is in turn mounted on the microscope fixedly or shiftably for the focusing and having a well known centering mechanism 12a, 12b engaging with the base portion of the support member 9 so that the support member 9 is adjusted to permit the center of the central hole 5a of the lower stage member 5 to coincide with the optical axis X–X while the lower stage member 5 is permitted to rotate.

The upper stage member 1 is provided with a rack 13 secured at the lower side thereof. The rack 13 extends in the direction of the movement of the upper stage member 1 relative to the lower stage member 5 so that, when the rack 13 is actuated, the upper stage member 1 is moved relative to the lower stage member 5.

The slide member 3 slidably guided in the upper stage member 1 is provided with a pair of guide plates 14a, 14b secured to the lower side of the slide member 3 in spaced relation from each other so as to define therebetween a guide slot 14 extending in the direction parallel to the movement of the upper stage member 1 relative the the lower stage member 5.

A slide member 15 is slidably guided in the lower stage member 5 by means of bearing balls 16 so as to move in the direction at a predetermined angle, preferably at a right angle, to the direction of the movement of the upper stage member 1 relative to the lower stage member 5. The slide member 15 is provided with a pin 17 secured to the upper side thereof which slidably engages in the guide slot 14 formed by the pair of guide plates 14a, 14b while a rack 18 secured to the lower side of the slide member 15. The rack 18 extends in the direction parallel to the movement of the slide member 15 relative to the lower stage member 5. Thus, when the rack 18 is actuated, the slide member 3 and hence the clamping holder 2 are moved relative to the upper stage member 1 through the pin-slot engagement 14, 17, independently of the movement of the upper stage member 1 relative to the lower stage member 5 regardless of the relative position of the upper stage member 1 with respect to the lower stage member 5.

It is apparent that the pin 17 may be secured to the slide member 3 and the slot 14 may be formed on the slide member 15 in place of the arrangement shown in FIG. 3 in order to achieve the same effect as obtained by the arrangement shown in FIG. 3.

In accordance with the characteristic feature of the present invention, a handle 19 is rotatably supported on the lower side of the support member 9 through the rotatable fitting of a shaft 20 fixedly mounting the handle 19 on its one end within a sleeve member 21 secured to the support member 9. A gear 22 is fixedly secured to the opposite end of the shaft 20.

Another handle 23 is rotatably fitted on the sleeve 21 so that the handle 23 is arranged coaxially with the handle 19. A gear 24 is fixedly secured to the handle 23.

As shown in FIG. 2, the handles 19 and 23 are located near the table (not shown) supporting the microscope and are stationary with respect to the microscope because they are mounted on the support member 9, thereby facilitating the manipulation of the handles 19, 23 by the observer.

Figure 6:
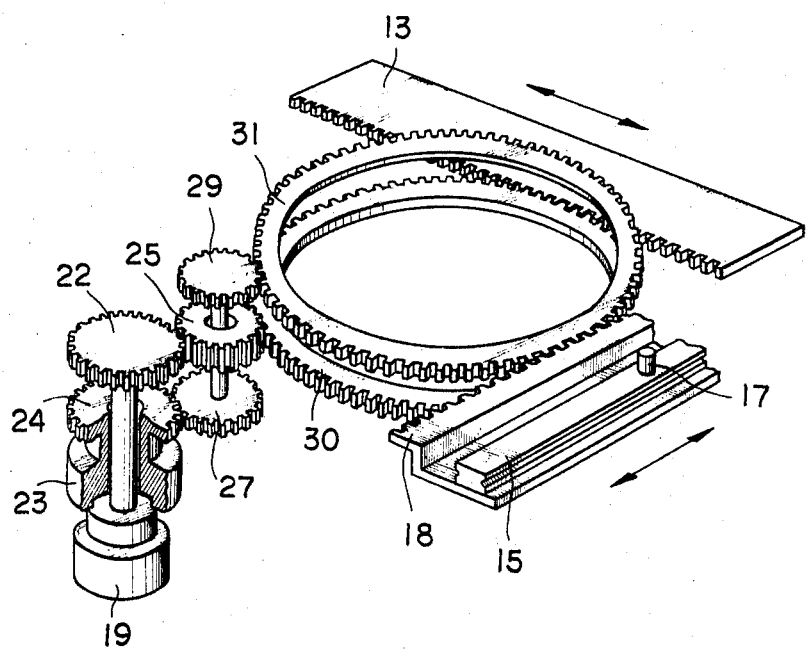
FIG. 6 is a perspective view of the gearing mechanism.

As may be clearly seen in FIG. 6, gear 22 meshes with an idle gear 25 freely rotatably mounted on a sleeve 26 secured to the support member 9 while the gear 24 meshes with an idle gear 27 secured to one end of a shaft 28 freely rotatably supported in the sleeve 26. An idle gear 29 is fixedly secured to the other end of the shaft 28 so as to rotate together with the idle gear 27.

A pair of ring gears 30 and 31 forming the coupling gear means are rotatably arranged around the cylindrical portion 5b of the lower side of the lower stage member 5 in overlying relationship on each other concentrically with respect to the axis of rotation of the lower stage member 5, i.e., concentrically with the optical axis X–X. The relative positions between the idle gears 26, 29, the ring gears 30, 31 and the racks 13, 18 are so selected that the ring gear 30 engages with the idle gear 25 as well as the rack 13 while ring gear 31 engages with idle gear 29 as well as rack 18. An annular distance ring 32 fitted on the cylindrical portion 5b and having a V-shaped convex cross section is interposed between the pair of ring gears 30, 31 as shown in FIG. 2 so that they are rotatably supported by the distance ring 32. The ring 32 is provided with at least one axially extending groove 32a in the inner surface of the ring 32 (FIG. 3) and a pin 33 secured to the cylindrical portion 5b of the support member 5 slidably fits in the groove 32a so that the ring 32 is axially slidable but prevented its rotational movement relative to the support member 5. An annular threaded ring 34 is fixedly threaded on the outer end of the cylindrical portion 5b of the support member 5 so as to loosely hold the pair of ring gears 30, 31 on the cylindrical portion 5b. The annular threaded ring 34 is provided with a thread on the outer periphery thereof and a clamping ring 35 formed with an annular raised portion 35a and having an operating lever 36 secured thereto is rotatably threaded on the outer thread of the ring 34. The ring 32 and the ring 35 serve as clamping means for clamping the ring gears 30, 31 against the lower stage member 5 or for clamping the lower stage member 5 against the support member 9. That is, when the clamping ring 35 is rotated by the lever 36 in one direction to approach the gear rings 30, 31, then the gears 30, 31 are pressed together by the annular raised portion 35a of the ring 35 against the lower face of the lower stage member 5 by virtue of the interposition of the distance ring 32 so that the gears 30, 31 are firmly clamped against the lower stage member 5. On the other hand, when the clamping ring 35 is rotated in the opposite direction, the ring 35 is urged against the support member 9 and, since the ring 35 is firmly fitted with the outer thread of the ring 34 fixedly secured to the lower stage member 5 by the abutment of the ring 35 against the support member 9, the lower stage member 5 is clamped against the support member 9.

Figure 4:
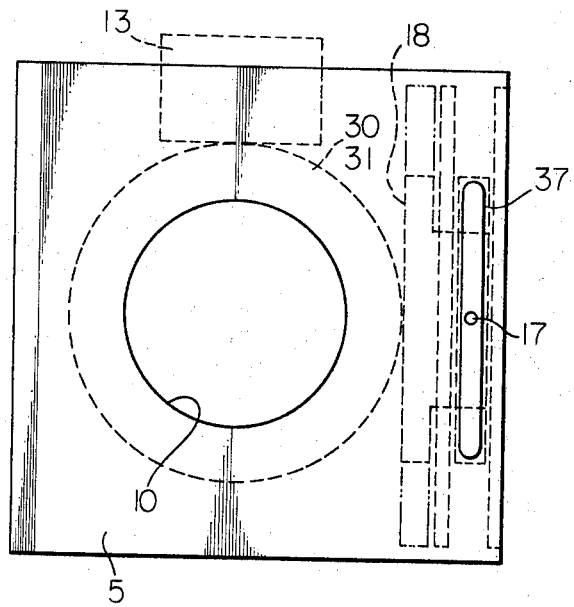
FIG. 4 is a sectional view taken along line IV–IV in FIG. 3.
Figure 5:
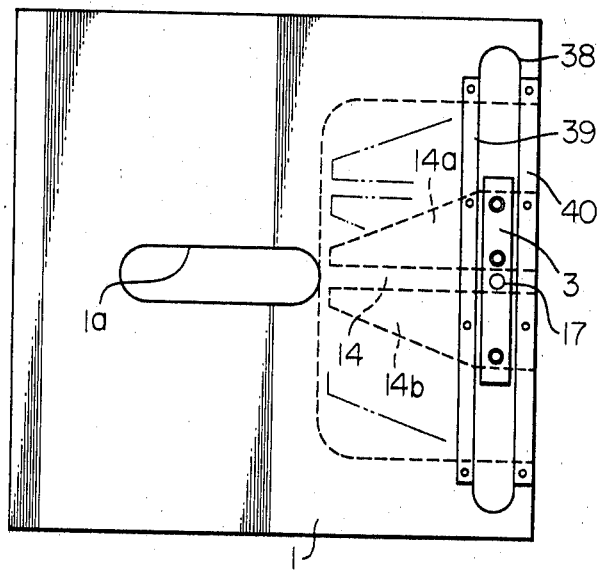
FIG. 5 is a sectional view taken along line V–V in FIG. 3.

As shown in FIGS. 3 and 4, the pin 17 loosely passes through an elongated slot 37 formed in the lower stage member 5, while the slide member 3 is located in a slot 38 formed in the upper stage member 1 and guided by the bearing balls 4 located between the slide member 3 and a pair of guide rods 39, 40 secured to the upper stage member 1 along the respective edges of the slot 38.

The operation of the stage as described above is as follows.

When the upper stage 1 is to be moved, the ring 35 released from the gear 30 and urged against the support member 9 by operating the lever 36 and the handle 19 is rotated. The rotation of the handle 19 is transmitted through the gear 22, the idle gear 25 and the ring gear 30 to the rack 13 secured to the upper stage member 1 so as to move the same. Since the rack 13 extends in the direction parallel to the movement of the upper stage member 1, the engagement of the rack 13 with the ring gear 30 is kept at all times regardless of the position of the upper stage member 1.

When the clamping holder 2 is to be moved, the handle 23 is rotated. The rotation of the handle 23 is transmitted through the gear 24, idle gears 27, 29 and the ring gear 31 to the rack 18 secured to the slide member 15 so as to move the same. Since the rack 18 extends in the direction parallel to the movement of the slide member 15, the engagement of the rack 18 with the ring gear 31 is kept at all times regardless of the position of the slide member 15. The movement of the slide member 15 is transmitted through the pin-slot engagement 14, 17 to the guide plates 14a, 14b secured to the slide member 3 slidably guided in the upper stage member 1 and carrying thereon the clamping holder 2. Since the slot 14 extends in the direction parallel to the movement of the upper stage member 1 relative to the lower stage member 5, the driving connection between the slide member 15 and the slide member 3 through the pin-slot engagement 14, 17 interposed therebetween is not affected by the movement of the upper stage member 1 regardless of the position of the upper stage member 1 relative to the lower stage member 5. Thus, the movement of each of the upper stage member 1 and the clamping holder 2 can be effected independently from each other by operating the respective handles 19 and 23.

When the stage is to be rotated, the ring 35 is urged against the ring gears 30, 31 by operating the lever 36 so as to prevent the ring gears 30, 31 from being rotated relative to the lower stage member 5 while the lower stage member 5 is made freely rotatable. Then, the lower stage member 5 is rotated to any desired rotational position. Since the ring gears 30, 31 are fixedly secured to the lower stage member 5 by the clamping ring 35, the position of the upper stage member 1 relative to the lower stage member 5 as well as the position of the clamping holder 2 relative to the upper stage member 1 is not varied by the rotation of the lower stage member 5 while the handles 19, 23 are free to rotate due to the relative movement between the ring gears 30, 31 and the idle gears 25, 29. When the stage is rotated to a desired position, the clamping ring 35 is operated so as to fix the lower stage member 5 to the support member 9. Then the operation of the upper stage member 1 and the clamping holder 2 can be effected in the manner as previously described.

Since the handles 19, 23 are mounted on the stationary support member 9, the handles 19, 23 are kept stationary at all times regardless of the movement of the upper stage member 1 and the clamping holder 2 and the rotation of the stage, thereby facilitating the operation of the handles 19, 23 without seeking them by the eyes of the operator.

It is apparent that the handle 23 may be mounted on the support member 9 at different position from the handle 19 insofar as it is located near the handle 19 so as to facilitate the operation of the both handles.

I claim:

1. Cross-moving stage of a microscope comprising a lower stage member supported by a support member mounted on the microscope, an upper stage member slidably supported on said lower stage member so as to be moved in one direction relative to said lower stage member, and a clamping holder for a slide glass and slidably supported on said upper stage member by a first slide member secured to said clamping holder and slidably guided in said upper stage member so as to be moved relative to said upper stage member in a direction at a predetermined angle, preferably at a right angle, to said one direction of the movement of said upper stage member, wherein the improvement comprises a first handle means rotatably supported on said support member and having a first gear fixedly secured thereto, a second handle means rotatably supported on said support member and having a second gear fixedly secured thereto, a first rack fixedly secured to said upper stage member and extending in the direction parallel to said one direction of the movement of said upper stage member, and a second rack fixedly secured to a second slide member slidably guided in said lower stage member relative thereto in a direction at a predetermined angle, preferably at a right angle, to said one direction of the movement of said upper stage member, said second rack extending in the direction parallel to the direction of the sliding movement of said second slide member, pin-slot means being provided so as to operatively connect said first slide member to said second slide member, the slot of said pin-slot means extending in the direction parallel to said one direction of the movement of said upper stage member, said first gear of said first handle means being operatively coupled with said first rack through coupling gear means rotatably supported on said lower stage member while said second gear of said second handle means is operatively coupled with said second rack through another coupling gear means also rotatably supported on said lower stage member, thereby permitting the movement each of said upper stage member and said clamping holder to be effected separately by operating either of said first and second handle means while the positions of said first and second handle means are kept stationarily with respect to the microscope regardless of the positions of said upper stage member and said clamping holder.

2. Cross-moving stage according to claim 1, wherein said second handle means is mounted coaxially with said first handle means by providing a sleeve member secured to said support member in interposed relationship between said first and second handle means.

3. Cross-moving stage according to claim 1, wherein said support member is adjustably mounted on a holder bracket which is in turn mounted on the microscope thereby permitting the centering of said support member with respect to the optical axis of the microscope to be effected.

4. Cross-moving stage according to claim 1, wherein said lower stage member is rotatably supported on said support member so as to be rotated about the optical axis of the microscope, and each of said coupling gear means and said another coupling gear means comprises a ring gear supported on said lower stage member so as to be rotated about the axis of rotation of said lower stage member and engaging with said first or second rack, each of said ring gears being coupled with said first or second gear through an idle gear freely rotatably supported on said support member so as to permit the engagement of each of said idle gears with the respective ring gears to be maintained regardless of the rotational position of said lower stage member, clamping means being provided for releasably arresting the relative rotation between said lower stage member and either of said ring gears or said support member thereby permitting said lower stage member to be rotated without changing the relative positions of said upper stage member and said clamping holder with respect to said lower stage member by clamping said ring gears against said lower stage member allowing said first and second gears to be rotated together with said first and second handle means by said ring gears through said idle gears while said lower stage member is held stationarily at its rotated position with respect to said support member by clamping said lower stage member against said support member by said clamping means.

5. Cross-moving stage according to claim 4, wherein said ring gears are axially shiftably supported on said lower stage member in overlying relation to each other, and said clamping means comprises a distance ring interposed coaxially between said ring gears and axially shiftably supported on said lower stage member while it is prevented from rotating relative to said lower stage member, and a clamping ring interposed between said support member and the adjacent one of said ring gears and threadedly engaged with said lower stage member so as to be rotated about the axis of rotation of said lower stage member, thereby permitting said ring gears to be clamped against said lower stage member in cooperation with said distance ring by rotating said clamping ring in one direction while said lower stage member is clamped against said support member by rotating said clamping ring in the opposite direction.